United States Patent
Westaway

(10) Patent No.: US 8,455,830 B2
(45) Date of Patent: Jun. 4, 2013

(54) DIRECTABLE LIGHT

(76) Inventor: Adrian Lucien Reginald Westaway, London (GB)

( * ) Notice: Subject to any disclaimer, the term of this patent is extended or adjusted under 35 U.S.C. 154(b) by 641 days.

(21) Appl. No.: 12/664,032

(22) PCT Filed: Jun. 11, 2008

(86) PCT No.: PCT/GB2008/001999
§ 371 (c)(1),
(2), (4) Date: Apr. 19, 2010

(87) PCT Pub. No.: WO2008/152382
PCT Pub. Date: Dec. 18, 2008

(65) Prior Publication Data
US 2010/0200753 A1    Aug. 12, 2010

(30) Foreign Application Priority Data

Jun. 13, 2007 (EP) .................... 07252384

(51) Int. Cl.
*G01J 5/02* (2006.01)
*H05B 39/08* (2006.01)
(52) U.S. Cl.
USPC .......................... 250/348; 315/149
(58) Field of Classification Search
USPC ......... 250/330, 332, 333, 334, 338.1, 339.14, 250/342, 347, 348, 353, DIG. 1; 315/149, 315/150, 151, 152, 155, 156
See application file for complete search history.

(56) References Cited

U.S. PATENT DOCUMENTS

| 5,023,709 | A | | 6/1991 | Kita et al. |
| 5,424,718 | A | * | 6/1995 | Muller et al. ................. 340/567 |
| 2002/0186221 | A1 | | 12/2002 | Bell |

FOREIGN PATENT DOCUMENTS

| EP | 0 814 344 A2 | 12/1997 |
| EP | 1 443 355 A2 | 8/2004 |
| GB | 1 393 794 A | 5/1975 |
| JP | 10-27505 A | 1/1998 |
| WO | 99/05857 A1 | 2/1999 |
| WO | 03/078894 A1 | 9/2003 |
| WO | 2007/110895 A1 | 10/2007 |

OTHER PUBLICATIONS

International Preliminary Report for parent application PCT/GB2008/001999, issued Dec. 17, 2009.
International Search Report for parent application PCT/GB2008/001999, having a mailing date of Sep. 18, 2008.
European Search Report for priority application EP 07 25 2384, having a completion date of Nov. 19, 2007.

* cited by examiner

*Primary Examiner* — Mark R Gaworecki
(74) *Attorney, Agent, or Firm* — Andrus, Sceales, Starke & Sawall, LLP

(57) ABSTRACT

A lighting apparatus has a directable beam and comprises a lamp for forming a beam of visible light; a steering mechanism, e.g. mirror for directing the beam in a desired direction; and a light and movement sensor, e.g. a video camera configured to detect movement in an image formed from radiation reflected from the beam. The sensor detects movement of the whole of an object within the beam or, if only part of the object is in the beam, the whole of the part within the beam. The apparatus also comprises a processor configured to control the steering mechanism to direct the beam in accordance with movement detected in the image of the beam, e.g. movement of an object or shadow within the beam.

16 Claims, 1 Drawing Sheet

DIRECTABLE LIGHT

CROSS-REFERENCE TO RELATED APPLICATIONS

This application is the U.S. national stage application of International Application No. PCT/GB2008/001999, filed Jun. 11, 2008, which International application was published on Dec. 18, 2008, as International Publication No. WO 2008/152382 A1 in the English language, which application is incorporated herein by reference. The International application claims priority of European Patent Application No. 07252384.8, filed Jun. 13, 2007, which application is incorporated herein by reference.

TECHNICAL FIELD

The present invention relates to a lighting apparatus in which it is possible to move a beam of light without touching the apparatus itself.

BACKGROUND ART

A lighting apparatus that produce a beam that can be steered in a desired direction remotely, for example using motors, is known for example in theatre lighting or in the home (see for example WO03/078894). However, such remote movement is mundane in nature and requires the operator to have a control unit to operate the motor to change the direction of the light beam. Also, it is hard to control the beam when the beam is directed at you or you are undertaking a task, e.g. surgery, that requires different locations to be illuminated at different times. The present invention provides a lighting apparatus and a method that allows a light beam to be directed by somebody without touching the apparatus and does not require a remote controller. Also, using the present invention, it is possible for a light beam to track the movement of a person automatically, i.e. without the need of a manually operated controller.

GB-1393794 discloses a method of lighting an actor on the stage with a spotlight. The spotlight produces a central tracker beam of non-visible radiation within the broader beam of visible radiation. The actor wears a special marker that reflects radiation from the tracker beam back to a multi-section detector. When the actor moves, reflected non-visible radiation is detected by a different section of the detector and the spotlight is moved accordingly. Such an arrangement requires the use of a special marker; also the marker may not be picked up by the detector, e.g. if the actor turns away from the spotlight. If at any stage the marker is not picked up, it is unlikely that it will be picked up later if the actor has moved.

EP-1443355 discloses a multifaceted mirror that reflects a light beam. The individual facets (or micromirrors) are each controllable so that they either direct the beam onto an object, e.g. an actor, or direct light away from the general direction of the object. The micromirrors are controlled by a processor to shape the beam so that it corresponds to the shape of the illuminated object. Movement of the object can be tracked by an operator directing the light on the object or can be tracked automatically using an automated tracking device such as "Wyborn's autopilot", which is a device that moves the beam of a light in accordance with the movement of special markers on the object.

WO2007/110895 discloses a device for aiming a light on a target area for use, e.g. in surgery, when the target area might be in shadow from an object, e.g. the surgeon's hands or surgical instruments. The light can be moved around a circular path and wherever it is on the path, the light is directed to illuminate the same area, which will generally lie under the centre of the path. The intensity of light reflected from the illuminated area is monitored and if it decreases, e.g. because an object is in the beam casting a shadow onto the target illuminated area, the light is moved around the track to illuminate the target area from a different angle that is not obscured by the object.

U.S. Pat. No. 5,023,709 describes a lighting unit that is similar in operation to GB-1393794 for lighting an actor. An infrared tracker beam is directed at the actor who wears a special marker that reflects the incident infrared radiation back to an infrared TV camera that detects the position of the marker and moves the lighting unit if the position of the marker changes. Such an arrangement has the same disadvantages as noted for the use of special markers in connection with GB-1393794.

EP-0814344 also discloses a lighting unit for directing light on an object that can move, e.g. an actor, but avoids the use of markers by using a CCD (charge couple device) camera that picks up the image of a target to be lighted in a lighting space. An image recognition unit processes the image from the CCD camera so as to recognize the target to be lighted and specify its coordinates. A coordinate calculation unit calculates the quantity of movement of the spotlight from a quantity of movement of the target to be lighted so that the spotlight tracks the object. Unfortunately, this apparatus is highly complex and expensive and so is unsuited for application outside the field of specialist spotlight tracking.

WO-9905857 discloses a method of converting the movement of an object on a surface, e.g. a sports field, into position coordinates that may be used to control equipment, e.g. spotlights. The movement of the object on the surface is tracked from above by a person pointing a device at the moving object. From the direction of pointing, the device outputs a signal indicative of the object's position, and the equipment is operated accordingly, e.g. spotlights illuminate the object.

US-2002/0186221 discloses a device providing interaction between a person and a scene projected around the person by a computer display system. The scene and a person's (or another object's) movement and position are captured by a camera and input into the computer. The person's actions can influence the projected display scene by tracking the user's movements and altering the scene consequently. For example the display scene could include a ball; the position of the ball in the scene is known to the computer. The user's foot movement is monitored by the computer and as the foot moves towards the image of the ball in the scene (as if the user were kicking the ball), the computer alters the displayed scene is altered to move the ball in the direction that it is "kicked".

In summary, the prior art teaches the tracking of spotlights on objects using either special markers or by shape recognition, with the disadvantages discussed above.

DISCLOSURE OF INVENTION

The present invention provides a lighting apparatus and a method of controlling the direction of a light beam as defined in the accompanying claims.

Broadly stated, the present invention directs a light beam and takes an image from radiation reflected by the light beam hitting an object, e.g. a wall. Changes in the image caused by movement of an object (which term includes for the purposes of this specification, a person and a shadow) in the beam is then analysed and the characteristics of the movement, e.g. speed, direction and/or acceleration of movement, is used to move the light beam in accordance with a preset algorithm.

Although it is possible to use the invention to track the movements of an object, e.g. an actor or lecturer on a stage, so that the light beam is directed at them despite the fact that they are moving, the primary application of the present invention is to alter the direction of a light beam so that the invention can be used to "push" or "pull" the light beam in a different direction, which is not only useful when wanting to move the beam to illuminate a different target, but is also fun to do and so the present application has application as a plaything. This allows the present invention to provide a simpler and cheaper device that does not require the use of special markers or shape recognition to move the beam.

The image is captured by a radiation and movement sensor, which can fit on a microchip so that it can be made cheaply enough to be affordable in a domestic setting, e.g. for moving the beam direction in a light in a kitchen illuminating a work surface or altering the angle on a desk light.

Although it is possible to move the lamp itself to change the direction of the beam, it is easier to direct the beam onto a reflector and move the reflector to change the direction of the beam. This type of reflector is well known in the field of theatre and dance lighting. Any other means that effects the required alteration in the direction of the beam may also be used.

The lamp or mirror can be moved by electric motors, e.g. stepping motors, or by linear actuators, pneumatic or hydraulic drives or by magnets or by any other controlled device that causes the required movement of the lamp or the mirrors.

The image is captured by a sensor, typically a video camera. In order to stop extraneous radiation affecting the sensor output, the sensor can be made primarily responsive to restricted wavelengths and/or brightness levels, e.g. using filters that limit the frequency reaching the sensor and/or the brightness levels that reach the sensor, for example using a wavelength pass filter or a neutral density filter. Instead of removing the effects of extraneous light using physical filtering, the same end can be achieved by electronic filtering of the response signal from the sensor, e.g. by removing from the sensor output the signal component due to radiation below a threshold brightness level or radiation in given wavelength range(s) or outside certain wavelength range(s).

For example, using either or both of these methods, the sensor could output a signal that is primarily dependent on the infrared radiation received and may be substantially insensitive to visible radiation. If the lamp used to produce the beam produces a substantial amount of infrared radiation, changes in the shape of the beam can be detected without the interference of visible light from other sources within the sensor's view.

The sensor can, for simplicity and cheapness, be in a fixed position relative to the light so that it surveys an area that is substantially larger than the size of the beam, which makes the processing of the beam image easier.

The processor can detect changes in the shape of the image of the beam using well known movement detection software, e.g. frame difference processing.

As described above, the lighting apparatus will respond to any movement within the beam irrespective of the object causing the movement. The present invention is configured to detect movement of the all objects within the beam or, if only part of an object is in the beam, all of the parts within the beam. Thus the present invention is not intended to cover the prior art arrangement using markers in which an object, e.g. an actor wearing a marker, is present in the beam but the system only responds to movement of the marker.

The radiation and movement sensor detects movement in an image formed from radiation reflected from the beam. Instead of responding to movement in an image of the whole of the beam, the sensor can be configured so that it detects movement in a predetermined part of the image, e.g. the central or outer parts of the image, corresponding respectively to the centre or the outer periphery of the beam. The sensor can also respond differently to movement in different parts of the image, for example it can be configured to respond to simultaneous movement in different parts of the image, e.g. different segments of the image. For example a clapping movement of a pair of hands in the beam can be detected, where the individual hands are detected in different parts of the image as changes in the image from the outside to the centre of the beam; such detected movement could be used to trigger a specific action, e.g. to turn off or to lock/unlock the beam. Alternatively, the arrangement could be such that the beam can be moved only if the beam is interrupted simultaneously on opposed sides of the beam, i.e. using a movement simulating the grasping of the beam similar to the movement of grasping a ball.

Movement in the image will often not be simple and it could be that two or more objects are moving in different directions within the image or a hand can be moved within the beam while the fingers are simultaneously moving relative to the palm. This can be interpreted in a number of ways by the processor. For example, it could be pre-programmed to respond to given patterns of movement, such as the above clapping movement, to elicit a pre-programmed response. Alternatively, the processor could take an average of all the movements in the image (or in a predetermined part of the image) to determine the change in the direction of the beam. The "average" may be an average of the movement vectors of the image so that, for example two identical objects moving in opposite directions could elicit no movement in the beam at all since the movements of the objects cancel each other out.

As mentioned, the invention is not limited to (and indeed not primarily intended to perform) a tracking function and, especially when used as a plaything, the beam can be made to move in a manner that is the same as, the movement of the object within the beam.

The movement sensed may be the direction of movement, the speed of movement or the acceleration of movement so that a rapidly accelerating movement could cause the beam to move in a way different from a constant movement or a fast movement could elicit a different pre-programmed response as compared to a slow movement or a combination of different movements in succession (for example successive slow and fast movements in opposite directions) could be interpreted to produce a predetermined response.

In addition to moving the beam, the present invention could be used to trigger other actions, e.g. the activation of additional lighting or other equipment.

It will be appreciated that a large number of different types of movement can be detected and used to elicit many different actions of the beam, including not moving the beam at all.

A lock may be provided that, when operational, prevents the beam being moved in accordance with movement in the image of the beam and, when released, allows the beam to be moved as described above. The lock could be turned on or off by a physical stitch, which could be remote from the lamp, or by predetermined movements within the beam.

DESCRIPTION OF DRAWINGS

The present invention will now be described, by way of example only, by reference to the accompanying drawings in which.

BEST MODE FOR PUTTING THE INVENTION INTO OPERATION

Figure 1:
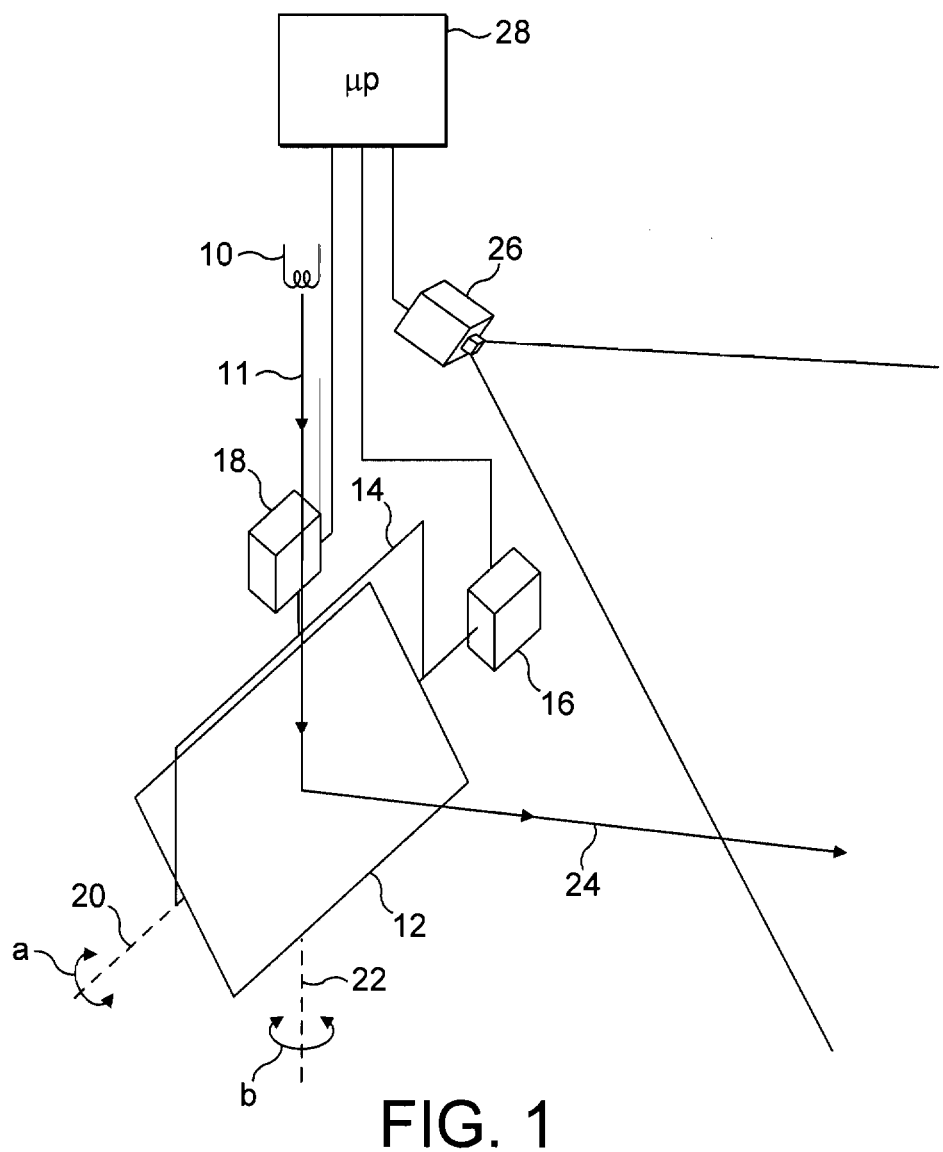
FIG. 1 is a schematic view of a lighting apparatus in accordance with the present invention.

Referring to FIG. 1 of the accompanying drawing, the apparatus includes a spot lamp 10, for example a 12 volt MR16 halogen bulb with integral reflector, which produces a light beam 11. This bulb offers a very bright, feathered and focused spot having a divergence of 8 to 12° that includes a substantial component of infrared radiation. In order to dissipate heat emitted by the lamp 10, it may be mounted on a heat sink (not shown).

The beam 11 is incident on a mirror 12, which can be rotated about a horizontal axis 20 by a stepper motor 16 and about a vertical axis 22 by means of a stepper motor 18, as indicated by the double headed arrows (a) and (b). This type of mirror is well known in the field of disco lighting and we used an Acme Winner DMX scanner mirror, which is generally used for directing spotlights across a disco dance room. The stepper motors 16, 18 are controlled by a microprocessor 28 via control lines, as shown, although they may be controlled wirelessly.

The beam 11 falling on the mirror 12 produces a reflected beam 24 directed at a desired location. The general area of the location is surveyed by a camera 26 which feeds signals back to the microprocessor 28 of the images captured. The camera 26 may be a simple and cheap web camera having a photosensitive chip behind a lens.

In order to discriminate between ambient light and light reflected from the beam, a filter blocking visible radiation is used in the camera 26, e.g. between the lens and the chip; the filter therefore screens out visible radiation but allows infrared radiation to pass through it. Successive frames of the image recorded are sent to microprocessor 28 via a lead as shown, although they can be transmitted wirelessly, if desired.

The microprocessor 28 includes commercially available software for analysing images. We have used MAX-MSP (which provides a graphical programming environment) with Jitter (a video analysis plug-in) and CV.Jit (an image analysis plug-in tool) which together offer excellent written motion analysis tools. The motion recognition software subtracts the value of each pixel in a current video frame from the value in the previous frame and produces a difference frame. If there has been no movement, then the difference frame is black but if the image has changed, then shapes are visible showing both the change in the current frame and the change in the previous frame. It is therefore possible to detect the speed of movement of an object moving within the image by calculating the distance that the object has travelled between the two frames in the time interval between the taking of the two frames. Acceleration can of course be calculated by the rate of change of the speed over a number of frames. The difference between the frames can also be used to detect the direction of movement and so it is possible to calculate a speed or acceleration vector from analysing the captured image. This sort of analysis is straightforward using standard software tools, such as those mentioned above.

The microprocessor performs the following algorithm:
1. When there is no movement, the camera sees the spotlight against a black background;
2. If there is no movement, then a difference screen between two consecutive frames is also black;
3. When an object or shadow moves within the beam, a difference frame indicates the movement of the object in the x and y axes of the image; from these, it is possible to calculate the direction and speed of movement;
4. A motion vector is calculated from the direction and speed of movement; and
5. The motion vector is used to control the motors 16, 18 to change the direction of the reflected beam 24 according to predetermined criteria set within the microprocessor which, at its simplest may be the application of a simple scaling factor between the movement vector and the command signals to the stepper motors 16, 18 controlling the movement of the mirror.

If there is detected motion in more than one direction, the beam may be moved by some composite amount taking into account all these movements, e.g. it could be moved in the direction and by an amount that is the average of the movement vectors across all the pixels in the image, which can be determined by a software algorithm based on the desired reaction, for example the average movement vectors.

Unfortunately, the movement of the beam may show up on the image captured by the camera. To prevent this interfering with the control of the beam movement, the processing may be discontinued (or the signal not supplied to the stepper motor or other moving mechanism) during movement of the beam. Alternatively, the processor may be provided with an algorithm that causes a predetermined movement of the beam, e.g. movement at a constant speed determined by the initial detected movement, while the object remains within the beam image and when the object stops being in the beam image, the beam movement also stops.

Alternative methods of detecting movement within the image are known, e.g. optical flow methods, the Hough transform, the Horn-Schunk method and the Lucas-Kande method.

Instead of surveying the whole of the environment of the beam 24 using a fixed camera, it is possible for the camera to be placed adjacent to the light source 10, to receive light along the same path 24, 11 as the emitted light. The advantage of such an arrangement is that the image of the beam can be larger and so provide higher resolution for movement analysis. A variant on this is to place a beam splitter in the path 24, 11 which can transmit most of the light but reflect a small proportion to the camera.

Also, higher definition images can be obtained by moving the camera in accordance with the movement of the mirror so that it is always directed at the beam. However, moving of the camera will show up in the captured image since the background will move; also, it is difficult to track exactly the movement of the beam with the movement of the camera.

It should be noted that it is not necessary to obtain feedback from the stepper motors 16, 18, since the microprocessor knows the positions of the stepper motors from a zero position since all the movement of the motors from their zero positions is initiated and controlled by the microprocessor, which keeps down the cost of the apparatus.

Figure 2:
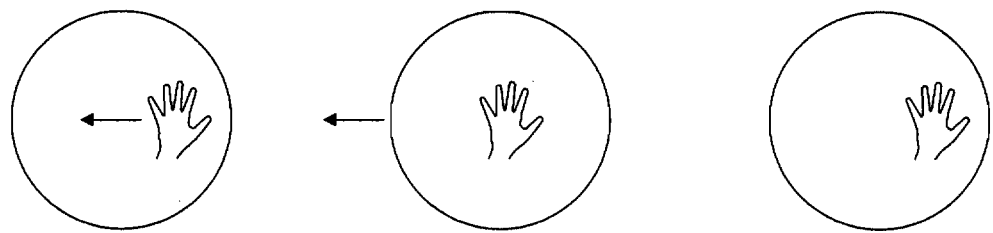
FIG. 2 is a view of a beam illustrating its movement.

As mentioned above, it is possible to use the present invention to keep a beam on a particular moving object. However, the primary use the present invention is to direct the beam to illuminate a different object or area, for example, if a hand is placed in a beam and moved towards the object or area to be illuminated, the beam will respond to the hand movements and move the beam, as shown in FIG. 2 where a hand moves to the left (see FIG. 2(a)) and consequently the beam also moves to the left (see FIG. 2(b)) to produce a beam where the hand is in the same position (see FIG. 2(c)). The software can be set up to ignore, or provide other special responses to, certain movements, e.g. movements above a certain speed, so that the quick withdrawal of the hand from the beam in the above example can be ignored and so the direction of the beam would not be altered as a consequence of the withdrawal. Another example would be that if movement were detected in a small number of pixels, e.g. caused by a fly moving across the beam, the processor could ignore such movement and so leave the orientation of the beam unaltered.

Using an arrangement as described above, it is possible to appear to move the beam as if by magic by manipulating your hands within the beam. This gives a highly entertaining effect and indeed the present application can be used as a game, which will be particular entertaining for children. To make the effect seem more "magical", the apparatus could be housed in a ceiling recess.

The present invention also finds application in the kitchen where it is possible to concentrate light on a specific part of a work surface and then move the beam to another part of the work surface without actually touching the light itself, which is especially useful if the operator's hands are dirty. A similar application can be used in surgery where it is possible to direct light onto a particular part of the patient that is being operated on and to move the spot without touching the light and thereby impairing sterility.

There is no limit to the scale of implementation of the present invention. It could be implemented on a scale of a desklight or a giant outdoor light.

As will be appreciated from the above discussion, any object falling within the beam can move the beam. This means that if the light is used to illuminate, for example, a cooking work surface where the operator is cutting vegetables, then the cutting movement of the knife and of the operator's hand will then produce movement of the beam. In order to overcome this, the beam may be locked in a certain position.

The invention claimed is:

1. A lighting apparatus having a directable beam, the lighting apparatus comprising:
    a) a lamp holder for holding and powering a lamp capable of forming a beam of visible light;
    b) a steering mechanism for directing the beam;
    c) a radiation and movement sensor configured to detect movement in an image formed from radiation reflected from the beam, said sensor being configured to detect movement of all objects within the image or within one or more predetermined parts of the image;
    d) a processor configured to control the steering mechanism to direct the beam in accordance with the said movement in the image of the beam, and
    e) a lamp capable of forming a beam of visible light;
    wherein the steering mechanism comprises a reflector that is located in the beam and that reflects the beam and that is movable in accordance with a signal from the processor.

2. A lighting apparatus according to claim 1, wherein the steering mechanism is configured to move the lamp holder.

3. A lighting apparatus according to claim 1, wherein the radiation sensor is configured to produce an output signal and the output signal is more responsive to non-visible radiation than to visible radiation and is substantially insensitive to visible radiation.

4. A lighting apparatus according to claim 3, wherein the non-visible radiation comprises infrared radiation.

5. A lighting apparatus according to claim 1, wherein the radiation sensor includes a filter for filtering out low-intensity radiation.

6. A lighting apparatus according to claim 5, wherein the filter comprises an optical filter.

7. A lighting apparatus according to claim 5, wherein the filter comprises an electronic filter.

8. A lighting apparatus according to claim 1, wherein the processor is configured to detect the said movement in the image of the beam.

9. A lighting apparatus according to claim 1, wherein the processor is configured to move the beam in accordance with one or more of:
    the direction of the movement detected;
    the speed of the movement detected; and
    the acceleration of the movement detected.

10. A lighting apparatus according to claim 1, wherein the radiation and movement sensor is in a fixed position and is capable of surveying an area larger than the area of the beam.

11. A lighting apparatus according to claim 1, wherein the movement in the image of the beam comprises movement of an object within the beam.

12. A lighting apparatus according to claim 1, wherein the movement in the image of the beam comprises movement of a shadow within the beam.

13. A lighting apparatus having a directable beam, the lighting apparatus comprising:
    a) a lamp holder for holding and powering a lamp capable of forming a beam of visible light;
    b) a steering mechanism for directing the beam;
    c) a radiation and movement sensor configured to detect movement in an image formed from radiation reflected from the beam, said sensor being configured to detect movement of all objects within the image or within one or more predetermined parts of the image;
    d) a processor configured to control the steering mechanism to direct the beam in accordance with the said movement in the image of the beam, and
    e) a lamp capable of forming a beam of visible light;
    wherein the apparatus further comprises a lock that, when operational, prevents the steering mechanism directing the beam in accordance with movement in the image of the beam and, when not operational, allows the steering mechanism to direct the beam in accordance with movement in the image of the beam.

14. A lighting apparatus having a directable beam, the lighting apparatus comprising:
    a) a lamp holder for holding and powering a lamp capable of forming a beam of visible light;
    b) a steering mechanism for directing the beam;
    c) a radiation and movement sensor configured to detect movement in an image formed from radiation reflected from the beam, said sensor being configured to detect movement of all objects within the image or within one or more predetermined parts of the image;
    d) a processor configured to control the steering mechanism to direct the beam in accordance with the said movement in the image of the beam, and
    e) a lamp capable of forming a beam of visible light;
    wherein the processor is configured not to move the direction of the beam when the sensor detects one or more predetermined types of movement in the image of the beam and/or to move the direction of the beam only when the sensor detects one or more predetermined types of movement in the image of the beam.

15. A method of controlling a direction of a light beam, the method comprising:
    a) forming a beam of visible light;
    b) detecting an image foamed by radiation reflected from the beam;

c) detecting movement of all objects within the image of the beam or within one or more pre-determined parts of the image; and d) altering the direction of the beam in accordance with the movements detected; wherein step c) comprises:
  i) detecting an image formed by radiation reflected from the beam;
  ii) detecting movement within the beam;
  iii) calculating the direction and speed of the movement;
  iv) generating a motion vector of the movement; and
  v) altering the direction of the beam in accordance with the motion vector.

16. A method according to claim 15, wherein step ii detects movement within the beam by frame difference processing.

* * * * *